United States Patent [19]

Illston et al.

[11] Patent Number: 5,554,271
[45] Date of Patent: Sep. 10, 1996

[54] METHOD OF MANUFACTURING A COMPOSITE MATERIAL

[75] Inventors: Trevor J. Illston; Paul A. Doleman, both of Derby; Edwin G. Butler, Warwick; Peter M. Marquis, Solihull; Clive B. Ponton, Birmingham; Reza Piramoon, Coventry; Mark J. Gilbert, Birmingham, all of England

[73] Assignee: Rolls-Royce plc, London, England

[21] Appl. No.: 244,075

[22] PCT Filed: Oct. 20, 1992

[86] PCT No.: PCT/GB92/01928

§ 371 Date: Mar. 8, 1995

§ 102(e) Date: Mar. 8, 1995

[87] PCT Pub. No.: WO93/10056

PCT Pub. Date: May 27, 1993

(Under 37 CFR 1.47)

[30] Foreign Application Priority Data

Nov. 22, 1991 [GB] United Kingdom .................. 9124822

[51] Int. Cl.$^6$ ................................................ C25D 13/02
[52] U.S. Cl. ................... 204/479; 204/483; 204/489; 204/490; 204/491; 204/507; 204/509
[58] Field of Search .................. 204/180.2, 180.4, 204/180.7, 180.9, 479, 483, 489, 490, 491, 507, 509

[56] References Cited

U.S. PATENT DOCUMENTS

| | | | |
|---|---|---|---|
| 4,923,578 | 5/1990 | Benton et al. | 204/130 |
| 5,211,822 | 5/1993 | Alary et al. | 204/180.7 |

FOREIGN PATENT DOCUMENTS

| | | |
|---|---|---|
| 63-233084 | 9/1988 | Japan . |
| 3-080172 | 6/1991 | Japan . |

OTHER PUBLICATIONS

Corden et al., "Oxidation and Wear resistant carbon—carbon composites." (1991) (no month).

Gal—Or et al., "Coating and Impregnation of carbon–carbon composites with ceramics by elechophoretiz deposition" (1989) no month.

*Primary Examiner*—Arun S. Phasge
*Attorney, Agent, or Firm*—Cushman Darby & Cushman

[57] ABSTRACT

A method of manufacturing a composite material which comprises ceramic fibers in a matrix of a ceramic material. A woven mat of ceramic fibers having an electrically conductive coating thereon is immersed in a sol. The sol comprises surface-charged ceramic particles. A potential difference is applied between the fibers and a second electrode placed in the sol. The applied potential difference is continued until the mat is permeated by the ceramic particles in the sol. The mat is removed from the sol and is then heated to sinter the permeated ceramic particles.

19 Claims, No Drawings

METHOD OF MANUFACTURING A COMPOSITE MATERIAL

This invention relates to a method of manufacturing a composite material and is particularly concerned with a method of manufacturing a composite material using electrophoresis.

It is well known that certain characteristics of some materials can be enhanced by reinforcing those materials with a suitably configured structure formed from a different material. In a typical example, the strength characteristics of one material can be enhanced by reinforcing that material with a different suitably strong material.

In the field of ceramics it is frequently desirable to reinforce a ceramic matrix material with high strength fibres of, for instance, alumina or silicon carbide. Difficulties arise, however, in ensuring that the reinforcing fibres are completely infiltrated by the ceramic matrix material.

One method of infiltrating reinforcing fibres with a ceramic matrix material is by the use of chemical vapour infiltration. In that technique, the fibres are placed in an atmosphere of a suitable vapour which is caused to chemically break down to deposit a ceramic material on the fibres. Ceramics such as silicon carbide can be deposited in this way. However it is a slow process which is expensive to carry out. In addition, it does have a tendency to produce a matrix material which has some degree of undesirable porosity.

Another technique is one which utilises liquid phase reaction. This involves infiltrating the reinforcing fibres with a liquid which progressively oxidises or reacts with a gaseous medium to form a ceramic matrix material. For instance, the fibres could be infiltrated by molten aluminium which is caused to oxidise to alumina as it infiltrates.

The drawback with this technique is that there is only a small range of materials which are suitable for use with it. Additionally there is the danger that unreacted metal could be left in the matrix material and the matrix material does tend to exhibit a certain degree of porosity.

A still further technique is one in which the reinforcing fibres are infiltrated with a liquid glass precursor material which is subsequently crystalised to form a ceramic product. The difficulty with this technique is that of the limited range of glass precursor materials which are available.

It is an object of the present invention to provide a method of manufacturing a composite material in which such difficulties are substantially avoided.

According to the present invention, a method of manufacturing a composite material comprises the steps of immersing an electrically conductive or semi-conductive porous reinforcing medium in a ceramic sol, each of said sol particles carrying a surface charge but not having a polymer coating thereon, applying a potential difference between said porous reinforcing medium and a further electrode in said sol sufficient to cause said sol particles to migrate through said suspension and be deposited upon said porous reinforcing medium, the application of said potential difference being continued until said porous reinforcing medium has been substantially completely permeated by said sol particles, discontinuing said applied potential difference, taking steps to ensure that said permeating sol particles remain in position within said porous medium after the discontinuation of said potential difference, removing said permeated porous medium from said sol subsequently sintering said permeating sol particles within said porous reinforcing medium.

The method of the present invention is directed towards the production of a composite material which comprises reinforcing fibres embedded in a matrix of a ceramic material.

Throughout this specification, the term "ceramic" is intended to include vitreous products as well as crystalline and semi-crystalline products and should be construed accordingly.

The fibres are initially arranged in the particular configuration which is desired in the final composite material. One convenient way of achieving this is to weave the fibres in the desired configuration. However, it will be appreciated that other measures could be taken to achieve the desired fibre configuration. Indeed the fibres could be arranged in tows which are subsequently wound on to an appropriately shaped mandrel to produce the desired configuration.

Although the present invention is primarily intended for use with reinforcing fibres, non-fibrous reinforcement could be utilised if so desired. Thus the present invention is generally applicable to reinforcing media which are porous. The term "porous" used throughout the specification should therefore be construed as embracing both fibrous structures and other porous structures such as foamed materials including foamed ceramics and reticular materials.

The fibres may be formed from any suitable electrically conductive or semi-conductive high temperature resistant reinforcing material. Thus they could be formed from a ceramic material such as alumina, silicon carbide or silicon nitride coated with an electrically conductive material such as carbon. Alternatively they could be formed from a suitable metal.

Initially, a suspension is prepared of small ceramic particles in a suitable liquid binder, usually aqueous. The ceramic particles must be sufficiently small to remain in suspension in the liquid vehicle. We have found therefore that it is most convenient to use a sol such as a silica sol or an alumina sol. It is important, however, that each of the sol particles should carry a surface charge.

The woven fibres, which are referred to as a fibre matt, are immersed in the sol. A potential difference is then applied between the fibre matt, which thereby serves as one electrode, and another suitable electrode immersed in the sol. The polarity of the two electrodes is arranged so that the surface charged sol particles are attracted to and therefore migrate through the sol to be deposited upon the fibre matt by electrophoresis.

The application of the potential difference between the electrodes is continued until the fibre matt has been substantially fully permeated by the ceramic sol particles. When this has been achieved, the applied potential difference is discontinued.

It is important that after the applied potential difference has been discontinued, the deposited sol particles remain in place within the fibre matt. To this end, therefore, the particular sol chosen is one which is capable of gelling. Thus the sol particles gel upon deposition and thereby from a self-supporting matrix within the fibre matt. However, other means may be employed to ensure that the deposited sol particles form a self-supporting matrix. For instance, a binder such as polyethylene oxide could be added to the sol so as to be co-deposited with, and thereby bind together, the sol particles.

After removal from the sol, the sol particle-permeated fibre matt is dried. It is then heated at elevated temperature, preferably under pressure, in order to sinter the permeating sol particles and thereby form a ceramic matrix. The thus formed ceramic matrix is thereby reinforced by the fibre matt.

It may be possible to manufacture a particular component merely from a single fibre matt. However this may not be possible with other, probably more complicated components. Under these circumstances, it may be desirable to produce a number of sol particle-permeated fibre matts and lay them up in a suitably shaped die. This, of course, has to be carried out before the permeated matts are dry so that they are sufficiently pliable. The matts are then dried in the die and heated under pressure to sinter the sol particles.

When permeated fibre matts are laid-up in the manner described above, there can sometimes be difficulty in achieving good density and fibre volume fraction in the resultant composite material. In order to avoid this, it may in certain circumstances be desirable to carry out an additional process step. After a number of permeated fibre matts have been produced as described above, a sol particle dip-coat is applied to them. The dip-coat is applied from a slurry of sol particles and a binder material such as polyethylene oxide. After the fibre matts have been dipped in the slurry and dried several times, they are laid up in the manner described earlier on a suitable die and heated under pressure to sinter the sol particles.

In order to demonstrate the effectiveness of the present invention, the following two examples were carried out:

EXAMPLE 1

Six woven ceramic matts of carbon coated silicon carbide fibres were prepared. The matts were prepared from a cloth which is sold under the name "Nicalon Grade 607" by the Nippon Carbon Co. Ltd. The matts were each 0.33 mm thick and 100 mm square.

The one matt was immersed in a silica sol which is sold under the name "Syton HT50" by Monsanto. The sol contains 50% by weight of silica particles and has a pH of 10.3.

The matt was connected to an electrical supply, as was a further electrode which had been immersed in the sol. A potential difference of 4 volts was then applied between the matt and the further electrode for a period of 10 minutes. The polarity of the applied potential difference was arranged so that the surface charged silica particles were attracted to and deposited upon the matt. The deposited silica particles then gelled to form a matrix within the matt. Upon removal from the sol visual inspection revealed that the matt had been substantially fully permeated by the silica particles.

The process was then repeated with the remaining five matts. However none of the permeated matts were allowed to dry out.

The six wet matts were then stacked in a suitably shaped graphite die. The die was then loaded in order to compress the stacked matts. Initially a load of 0.5 tons was applied and the temperature of the matts was raised to 1400° C. at the rate of 50° C. per minute. The load was then increased to 10 tons and maintained at that value for 30 minutes while the temperature was maintained at 1400° C. The load was then released and the permeated matts allowed to cool to room temperature.

Visual examination of the matts revealed that they had fully fused together and that the silica sol particles had sintered. Subsequent microstructural examination revealed that there had been good penetration of the matts by the sol particles and there was a good overall surface appearance. However there was a limited amount of microcracking in the interlayer region of the matrix due to silica crystallisation.

The resultant composite material had a density of 2.16 grams/cc and a fibre volume fraction of 0.59.

EXAMPLE 2

A sol was prepared by adding 2% by weight of an alumina sol to a silica sol and then milling the mixture for two hours. The silica sol was that sold under the name "Syton 50" by Monsanto. It contains 50% by weight of silica particles and has a pH of 10.3. The alumina sol was that sold under the name "Remal 20" by Remet Corporation. It contains 19.5% by weight of alumina particles and has a pH of 3.7.

The thus prepared sol was then equally divided into two portions.

Eight woven ceramic matts of carbon coated silicon carbide fibres were then prepared. The matts were prepared from the same cloth as that used in example 1, i.e. "Nicalon grade 607". The matts were each 0.3 mm thick and 100 mm square.

One matt was immersed in one of the sol portions and was connected to an electrical supply, as was a further electrode which has been immersed in the sol. A potential difference of 4 volts was then applied between the matt and the further electrode for a period of 5 minutes. The polarity of the applied potential difference was arranged so that the surfaced charged silica and alumina particles were attracted to and deposited upon the matt. The deposited silica and alumina particles then gelled to form a matrix within the matt. Upon removal from the sol, visual inspection revealed that the matt had been substantially fully permeated by the silica and alumina particles.

The process was then repeated with the remaining seven matts using the same sol portion. However none of the permeated matts were allowed to dry out.

The other sol portion was then taken and two aluminium plate electrodes were immersed in A potential difference of 32 volts was then applied between the plates for a period of 15 minutes. This resulted in the deposition of a 4 mm thick gelled silica and alumina particle layer on one of the electrodes.

The coated electrode was then removed from the sol and allowed to dry. The dried gel coating was scraped off the electrode and then suspended in a 10% by weight solution of polyethylene oxide binder. Each matt was then in turn dipped in the suspension, allowed to dry, re-dipped in the suspension and again allowed to dry.

The matts were then stacked in a suitably shaped graphite die. The die was then loaded in order to compress the stacked matts. Initially a load of 6.25 tons was applied and the temperature of the matts was raised to 1200° C. at the rate of 40° C. per minute. The applied load was then increased to 25 tons. This was held for 30 minutes whereupon the temperature was increased to 1340° C. at a rate of 40° C. per minute. The load was then removed and the matts were allowed to cool to room temperature.

Visual examination of the matts revealed that they had fully fused together and that the silica and alumina sol particles had sintered. Subsequent microstructural examination revealed that there had been good penetration of the matts by the sol particles and there was low porosity with a good overall surface appearance. The density of the resultant composite material was 2.26 grams/cc and it had a fibre volume of 0.25. There was no observable cracking or detectable cracking of the silica phase.

Mechanical testing revealed that the composite material had a 3 point bend UTS of 236.4 MPa and a Youngs Modulus of 63.54 GPa.

It may be desirable under certain circumstances to achieve a high density matrix. In order to achieve this a further densification step is necessary. This can be achieved if the particular sol particles chosen are capable of remaining viscous during the compression stage, thereby permitting the use of high compression loads.

The present invention has been described with reference to the manufacture of test pieces. It will be understood however that with the use of appropriately shaped dies, actual components could be produced from stacked matts subjected to suitably high compression loads.

The method of the present invention is particularly useful in the manufacture of high temperature aerospace components, ceramic tube burners, power generation equipment, furnace components and refractory components in general.

We claim:

1. A method of manufacturing a composite material comprising the steps of:

immersing an electrically conductive porous reinforcing medium in a ceramic sol, said ceramic sol comprising a plurality of sol particles, each carrying a surface charge and not having a polymer coating thereon;

applying a potential difference between said porous reinforcing medium and an electrode immersed in said sol, said potential difference being sufficient to cause said surface-charged sol particles to migrate through said sol and be deposited upon said porous reinforcing medium, said step of applying said potential difference being continued until said porous reinforcing medium is substantially completely permeated by said sol particles;

discontinuing said application of said potential difference;

fixing said sol particles in position within said porous reinforcing medium after said step of discontinuing said potential difference;

removing said permeated porous reinforcing medium from said sol and subsequently sintering said sol particles permeated within said porous reinforcing medium.

2. A method of manufacturing a composite material as claimed in claim 1 wherein said sintering step is carried out while applying a compressive load to said sol particle permeated porous reinforcing medium.

3. A method of manufacturing a composite material as claimed in claim 2 wherein said compressire load is uniaxially applied.

4. A method of manufacturing a composite material as claimed in any one of claims 1 to 3, wherein said porous reinforcing medium comprises fibers.

5. A method of manufacturing a composite material as claimed in claim 4 wherein said porous reinforcing medium comprises woven fibers.

6. A method of manufacturing a composite material as claimed in claim 4 wherein said fibers comprise a ceramic material and have an electrically conducting coating formed thereon.

7. A method of manufacturing a composite material as claimed in claim 6 wherein said electrically conductive coating comprises carbon.

8. A method of manufacturing a composite material as claimed in claim 6 wherein said fibers comprise silicon carbide.

9. A method of manufacturing a composite material as claimed in claim 1 wherein said sol particles gel upon deposition on said porous reinforcing medium to thereby maintain said permeating sol particles in position within said porous reinforcing medium after said step of discontinuing said potential difference.

10. A method of manufacturing a composite material as claimed in claim 1 wherein said sol is a silica sol.

11. A method of manufacturing a composite material as claimed in claim 1 wherein said sol comprises sol particles of more than one material.

12. A method of manufacturing a composite material as claimed in claim 11 wherein said sol particles comprise silica and alumina particles.

13. A method of manufacturing a composite material as claimed in claim 1 wherein said sol includes a binder material which is co-deposited with said ceramic sol particles so as to bind said ceramic sol particles within said porous reinforcing medium.

14. A method of manufacturing a composite material as claimed in claim 13 wherein said binder material comprises polyethylene oxide.

15. A method of manufacturing a composite material as claimed in claim 1 wherein said porous reinforcing medium comprises at least one mat.

16. A method of manufacturing a composite material as claimed in claim 15 wherein said porous reinforcing medium comprises a plurality of said mats, the method further comprising a step of stacking said plurality of sol particle permeated mats prior to said sintering step.

17. A method of manufacturing a composite material as claimed in claim 16 further comprising a step of dipping each said sol particle permeated mat in a suspension of sol particles and a binder, prior to said stacking step.

18. A method of manufacturing a composite material as claimed in claim 17 wherein said sol particles are the same as those permeating each said mat.

19. A method of manufacturing a composite material as claimed in claim 17 wherein said binder comprises polyethylene oxide.

* * * * *